United States Patent
Tödtmann

(10) Patent No.: US 8,355,620 B2
(45) Date of Patent: Jan. 15, 2013

(54) METHOD AND DEVICE FOR RECORDING

(75) Inventor: Thorsten Tödtmann, Feucht (DE)

(73) Assignee: Grundig Multimedia B.V., Amsterdam (NL)

( * ) Notice: Subject to any disclaimer, the term of this patent is extended or adjusted under 35 U.S.C. 154(b) by 1867 days.

(21) Appl. No.: 10/416,293

(22) PCT Filed: Nov. 3, 2001

(86) PCT No.: PCT/EP01/12762
§ 371 (c)(1),
(2), (4) Date: Sep. 10, 2003

(87) PCT Pub. No.: WO02/39749
PCT Pub. Date: May 16, 2002

(65) Prior Publication Data
US 2004/0071447 A1    Apr. 15, 2004

(30) Foreign Application Priority Data
Nov. 10, 2000 (DE) .................... 100 55 937

(51) Int. Cl.
H04N 9/82 (2006.01)
(52) U.S. Cl. .................... 386/246; 386/353
(58) Field of Classification Search ............. 386/1, 46, 386/52, 66, 93, 95, 112, 121
See application file for complete search history.

(56) References Cited

U.S. PATENT DOCUMENTS

| | | | |
|---|---|---|---|
| 6,204,883 B1 * | 3/2001 | Tsukagoshi | 348/468 |
| 6,289,169 B1 * | 9/2001 | Okuyama | 386/231 |
| 2002/0006165 A1 * | 1/2002 | Kato | 375/240.25 |
| 2002/0013949 A1 * | 1/2002 | Hejna, Jr. | 725/100 |
| 2002/0040475 A1 * | 4/2002 | Yap et al. | 725/39 |
| 2002/0186961 A1 * | 12/2002 | Kikuchi et al. | 386/98 |

FOREIGN PATENT DOCUMENTS

| | | |
|---|---|---|
| EP | 0 680 152 A2 | 11/1995 |
| EP | 0 802 682 A1 | 10/1997 |

OTHER PUBLICATIONS

Kondo S et al: "One-Pass Variable Bit Rate MPEG2 Video Coding Method For Digital Video Recording", Japanese Journal of Applied Physics, Tokyo, Japan, Bd. 37, Nr. 4B, 1998, XP000885326, ISSN: 0021-4922.

Yokoyama Y et al: "A Scene-Adaptive One-Pass Variable Bit Rate Video Coding Method For Storage Media", Proceedings. International Conference On Image Processing, Bd. 3, 24. Oct. 24, 1999, pp. 827-831, XP002143576.

Rugh, Wilson J.; Nonlinear System Theory, The Volterra/Wiener Approach; The Johns Hopkins University Press, 1981 (ISBN 0-8019-2549-0); pp. 1-32.

* cited by examiner

*Primary Examiner* — William C Vaughn, Jr.
*Assistant Examiner* — Eileen Adams
(74) *Attorney, Agent, or Firm* — Boyle Fredrickson, S.C.

(57) ABSTRACT

The invention relates to a method and device for recording coded digital audio-visual data. On recording coded digital audio-visual data a problem occurred that predictions about the remaining available recording time on a mass storage medium being used were not possible because the applied coding causes the data rate of the digital audio-visual data to vary considerably. According to the invention, the problem may be avoided, by determining mean data rates for program sections which enables a prediction of the amount of data storage capacity to be expected for each program section.

16 Claims, 1 Drawing Sheet

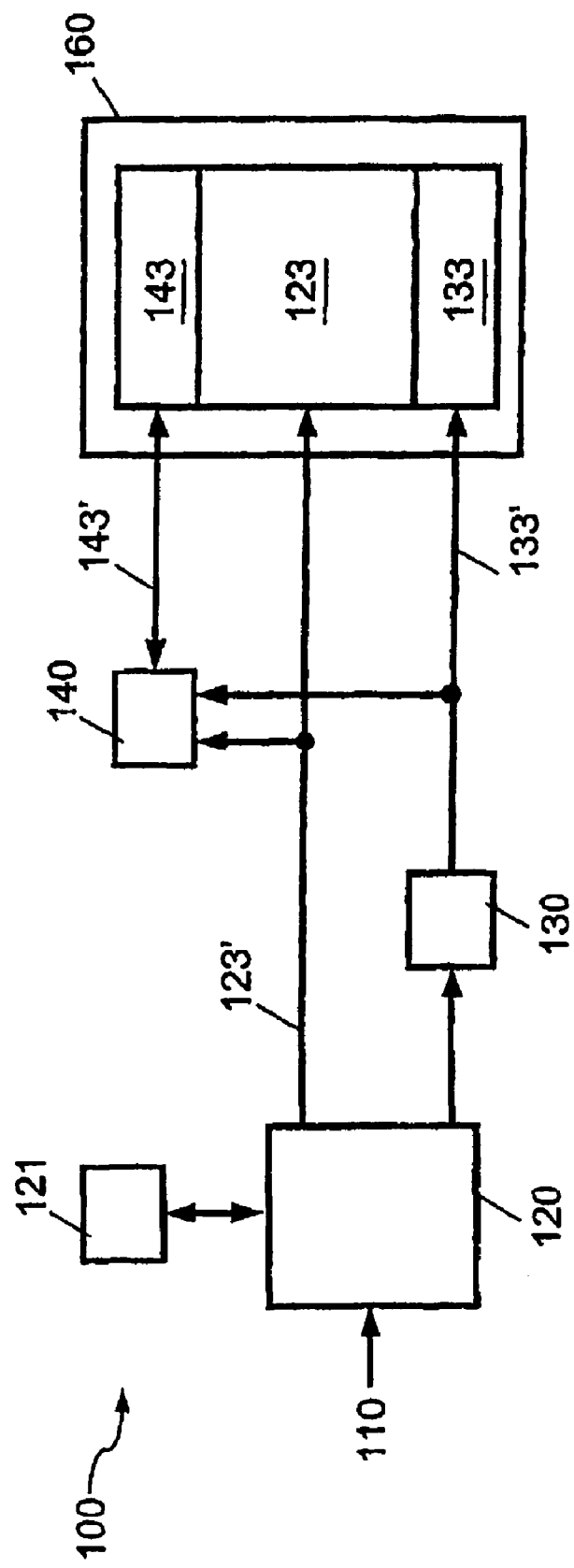

METHOD AND DEVICE FOR RECORDING

The present invention concerns a method and a device for the recording of coded digital audiovisual data.

The storage of coded digital audiovisual data in mass storage media, such as hard disk (HD) or writable optical storage media is known. Usually the coded digital audiovisual data are coded for reducing data with the aid of known coding methods, for example, according to one of the MPEG standards. For the purpose of transmission, for example, with the aid of radio or satellite signals, the coded digital audiovisual data of several program contributions are combined to a transport data stream. In order to be able to record coded digital audiovisual data of a certain program contribution, for example, of a film or a live transmission of an event, the coded digital audiovisual data representing the specific program contribution are isolated from the transport data stream.

However, when recording coded digital audiovisual data, a problem occurs in that it is not possible to predict the available duration of recording of the mass storage medium used, because, due to the coding used, the data rate of the coded digital audiovisual data can fluctuate greatly. This causes problems, especially in the case of the live events mentioned above, because it is not possible to predict the amount of data that occur during the live event, so that determination of the remaining recording time of the mass storage medium cannot be made. However, even in the case of the already existing program contributions, for example films, information about the total amount of data or the remaining amount of data of the coded digital audiovisual data of the program contributions is not simply available during the transmission of the particular program contribution, since usually such information is not contained in the data sent. If such information could be made available during or before the transmission of the program contribution, although for the completely available program contributions mentioned above, a prediction could be made about whether or not they can be recorded completely on the mass storage medium used, before the live events, also mentioned above, such a prediction is impossible for the reasons stated above. Decoding of the coded digital audiovisual data before recording is also a possibility. In this way, the amount of data to be recorded would also become known in the case of a live event of known duration. However, this solution has the disadvantages that the advantage of the coding—the reduction of the amount of data to be recorded—would be lost and that additionally a decoder and an encoder would become necessary.

Therefore, the known state of the art has the disadvantage that data about the needed amount of storage for a program contribution can only be made afterwards, that is, after the program contribution is completely available. A prediction whether a program contribution can be recorded completely on a particular mass storage medium used is thus not possible during or before recording of the program contribution.

Therefore, the task of the present invention, to provide a method and a device for recording of coded digital audiovisual data which permits making a prediction before or during the recording of a program contribution about how much memory will be required for recording the coded digital audiovisual data of the program contribution.

In the present invention, this task is solved by the characteristics of claims 1 and 7.

The invention is based on the consideration that, for the coded digital audiovisual data, information about the mean data rate of program contributions is determined, which make it possible to predict the expected amount of data of a particular program contribution.

The advantage of the invention is to be regarded in the fact that, by using the mean data rate, the expected amount of data of each program contribution can be determined or estimated. As a result of this, predictions about the memory space requirement of the program contributions to be recorded becomes possible. This again makes it possible to make a prediction about whether or not the amount of memory of a mass storage medium used for the recording is sufficient for recording the program contribution.

Other advantages of the invention follow from the dependent claims, as well as from the description of an embodiment of a device according to the invention with the aid of a FIGURE, given below.

The single FIGURE shows the principle of the circuit diagram of a practical example of a device for recording of coded digital audiovisual data.

In order to facilitate understanding of the present invention, in the FIGURE, only those components of the practical example are shown which are of importance in connection with the invention.

The FIGURE shows the principle of the circuit diagram of a practical example of a device 100 for recording of digital audiovisual data in the recording of coded digital audiovisual data. For example, the coded digital audiovisual data can be contained in a DVB transport data stream (DVB: Digital Video Broadcast), which contains several digital audiovisual data streams coded according to MPEG (MPEG: Motion Picture Expert Group). Here, each of the coded digital audiovisual data streams corresponds, for example, to a program contribution, for example, a film or transmission of a live event.

The device 100 used for recording contains a demultiplexer 120 (transport demultiplexer), for separating a transport data stream 110 into the individual coded digital audiovisual data streams 123', each of which represent a program contribution and will be called program data below. The program data 123' contain essentially audio data, video data as well as other data. The other data contain, for example, teletext, electronic program listings, databases for sending contributions, for example, texts for radio plays, information for films, details about actors, etc. These can be, for example, presented separately or together with the video and/or audio data of the program data 123'.

For the purpose of demultiplexing of the transport data stream 110, a system clock is recovered from the transport data stream 110 by a device 121 for clock recovery. The program data 123' are recorded in a second area 123 of a storage medium 160, for example, a hard disk (HD), a writable optical storage medium or a suitable solid storage medium.

In addition, the transport demultiplexer 120 provides information about the particular program contribution. This information is evaluated by a decoder 130 and data, such as sender name, start time and end time, origin, type or nature of the program contribution, etc., are made available. The program information 133' of device 130 is recorded in a third area 133 of the HD 160.

Using a device 140, for example, a microcomputer into which the program data 123' as well as program information 133' are entered, the particular instantaneous data rate 143' of the program data 123' to be recorded as well as preferably the data rate of program information 133', which is low in comparison to the data rate of the program data 123', are determined and recorded continuously in a first region 143 of HD 160.

After completion of the recording of a program contribution, a weighted mean data rate is determined by device 140 for the instantaneous data rates stored in the first region 143 of HD 160. Weighted means that the instantaneous values of the data rate of the actual mean value formation are weighted with a characteristic which may be nonlinear, and which is dependent on the time and/or genre. Similarly, it is possible to determine the weighted mean data rate by continuous evaluation of the instantaneous data rate during the recording of a program contribution. Another possibility is the determination of the weighted mean data rate after recording of a program contribution when the then known total amount of data is divided by the duration of the recording. For this purpose, the duration of recording can be determined either directly by device 140 or by evaluation of the information originating from decoder 130 through the start time and end time of the recorded program contribution.

The weighted mean data rate of the particular program contribution thus determined is then linked by device 140 with the information of decoder 130 and stored in the first memory area 143 of HD 160. The produced linking concerns the data of sender names and genre or type of program contribution. Thus, conclusions are possible regarding the weighted mean data rate of a given sender. Similarly, it is possible to assign a weighted mean data rate to certain program contributions, for example, feature films, documentaries, sports programs, etc. The quality of the determined mean weighted data rates is dependent on the evaluation of a number of program contributions of each genre or evaluation of the data stream of a sender for a long period.

In the recording of a program contribution, it is possible to determine the memory requirement of the program contribution which is to be recorded by evaluation of the weighted mean data rates stored in the first memory area 143 of HD 160 as well as of the information originating from decoder 130 about sender, genre, starting- and stopping time. For this purpose, device 140 multiplies the mean weighted data rate of the corresponding genre or of the corresponding sender with the time duration of the program contribution determined from the starting time and stopping time. The memory requirement determined in this way is compared by device 140 with the memory still available on HD 160.

If the still available memory is sufficient, the program contribution is recorded. If the memory is not sufficient, various procedures can be provided.

In case a user is present or can be reached during the recording, device 140 produces a notice and then displays this, for example, on the screen or monitor of a television equipment or computers connected directly to device 100 or connected to it through an antenna or bus system. Then the user has to make the choice to discontinue recording or to erase other already stored program contributions. For this purpose, for example, a list can be generated by device 140, which contains data such as title, day of the recording, etc., in order to make it possible for the user to choose the already stored program contribution(s) to be erased.

Another possibility is that the user determines ahead of time which program contributions are to be erased in case the memory capacity is exceeded. The criteria for the marking of the program contributions to be erased can be, for example, the age of the program contribution (day of recording), the day of the last replay of the program contribution, the frequency of replay of the program contributions, the genre of the program contribution, etc. In addition, a user-oriented adaptation may occur through device 140 when the behavior of the user is protocoled and then it is determined that certain program contributions, for example, sports programs, as a rule, are erased after viewing them once. Such program contributions are then released automatically for erasing.

Another possibility is the swapping-out of data. In case—as already indicated above—device 100 is connected with computers through a bus system, the data of the stored program contributions can be swapped-out by HD 160 to a connected computer or to also connected storage media, such as a tape memory. In an advantageous embodiment of the invention, this swapping-out is done in an off-line operation. As a result, slower storage media may be used. The final decision about the swapped-out program contribution can be made then by the user.

In addition to the above-described division of the storage medium 160, other divisions of the storage can be made. For example, the areas 123 to 143 can be created separately for a program contribution so that, for example, the data of a program contribution follow the data of another one. However, the areas 123 to 143 can also be created in such a way that, within the individual regions, the data of a program contribution border the data of a subsequently recorded program contribution.

The device on which digital audiovisual data coded by MPEG for recording and replay can be used correspondingly only for coded digital audio data, for example, in order to record radio programs.

The invention claimed is:

1. Device for recording coded digital audiovisual data being received from a digital video broadcast event via video signals in which information about the total amount of data or the remaining amount of data of the coded digital audiovisual data of the program contributions is not received with the coded digital audiovisual data, which comprises:

a mass storage medium for storing at least one portion of coded audiovisual program data, said portion including at least one of audio data and video data from a program contribution, and said portion having a varying data rate, a device for continuous determination of an instantaneous data rate, to determine a weighted mean data rate for the respective portion of the program data and to determine, based on the weighted mean data rate and based on program information about the program contribution, if sufficient storage capacity is present in a corresponding portion of the mass storage medium for a complete recording of the portion of coded audiovisual program data of the program contribution, the device further comprising:

a demultiplexer for separation of the portion of coded digital audiovisual program data with a varying data rate, which is a part of a program contribution, from a transport data stream, a program information decoder connected to the demultiplexer for obtaining the program information about the program contribution, wherein the program information includes at least one of a genre and a sender, and also includes a starting time and stopping time for the portion of the program contribution, and wherein said program information does not include information about the total amount of data or the remaining amount of data of the coded digital audiovisual data of the program contributions, and another storage area provided in the mass storage medium, which is provided for storing the instantaneous data rate determined in the device for later access in determination of the weighted mean data rate for respective portions of the program contribution; and wherein the weighted mean data rate is a nonlinear function of values for the instantaneous data rate and wherein the weighted mean data rate is further related to at least one of: a) a plurality of program contributions of each genre and b) an evaluation of the transport data stream of a sender.

2. Device according to claim 1, wherein the device is provided for linking the weighted mean data rate with the information derived by the program information decoder and the other storage area of the storage medium is provided for storing the linked information.

3. Device according to claim 1, wherein the storage medium has another storage area which is provided for storing the program information derived from the program information decoder.

4. Device according to claim 3, wherein in the determination of a mean data rate, the device takes into consideration the program information data recorded in the other storage area.

5. Device according to claim 1, wherein the device is a microcomputer.

6. Device according to claim 1, wherein the coded digital audiovisual data as well as the program data are coded according to MPEG.

7. A method comprising: recording coded digital audiovisual data from a broadcast event via video signals in which information about the total amount of data or the remaining amount of data of the coded digital audiovisual data of the program contributions is not received, the method further comprising:

separation of coded digital audiovisual program data with a varying data rate, which represent a program contribution, from a transport data stream, further conducting the separated coded digital audiovisual program data with varying data rate to a mass storage medium, recording the separated coded digital audiovisual program data in a storage area of the mass storage medium, decoding of program information about the program contribution derived from the transport data stream, wherein said program information does not include information about the total amount of data or the remaining amount of data of the coded digital audiovisual data of the program contributions, continuous determination of an instantaneous data rate of the program contribution and continuous storage of the determined instantaneous data rates in another storage area of the mass storage medium, determination of a weighted mean data rate of the program contribution by evaluation of the instantaneous data rates, wherein the weighted mean data rate is a nonlinear function of values for the instantaneous data rate;

wherein the weighted mean data rate is further related to at least one of: a) a plurality of program contributions of each genre and b) an evaluation of the transport data stream of a sender;

and based on the weighted mean data rate and the program information not including information about the total amount of data or the remaining amount of data of the coded digital audiovisual data of the program contributions, determination of whether the available storage capacity of the mass storage medium is sufficient for complete recording of the coded audiovisual program data of the program contribution.

8. Method according to claim 7, wherein the program information is linked with the weighted mean data rate and that the determination, if the available storage capacity is sufficient for recording of the program data of a program contribution, is carried out with the aid of the weighted mean data rate, which is linked to the program information.

9. Method according to claim 7, wherein a weighted mean data rate is determined.

10. Method according to claim 7, wherein the coded digital audiovisual data as well as the program data are coded according to MPEG.

11. Method according to claim 7, wherein the program information includes at least one of a genre and a sender name, and also includes a starting and stopping time for the program data of a program contribution.

12. Method according to claim 7, wherein a warning notice is produced when the available storage capacity is exceeded.

13. Method according to claim 7, wherein when the available storage capacity is exceeded, the recording is ended.

14. Method according to claim 7, wherein when the available storage capacity is exceeded, at least one already stored program contribution is erased.

15. Method according to claim 14, wherein the at least one already stored program contribution is selected and erased by a user.

16. Method according to claim 14, wherein the at least one already stored program contribution is selected by a user ahead of time and is automatically erased when the available storage capacity is exceeded.

* * * * *